United States Patent
Türck et al.

(10) Patent No.: US 6,824,714 B1
(45) Date of Patent: Nov. 30, 2004

(54) DEVICE AND METHOD FOR GENERATIVE PRODUCTION OF A THREE-DIMENSIONAL OBJECT

(75) Inventors: Harald Türck, München (DE); Hans Perret, München (DE); Jochen Weidinger, München (DE)

(73) Assignee: EOS GmbH Electro Optical Systems, Planegg (DE)

( * ) Notice: Subject to any disclaimer, the term of this patent is extended or adjusted under 35 U.S.C. 154(b) by 315 days.

(21) Appl. No.: 10/069,558

(22) PCT Filed: Aug. 3, 2000

(86) PCT No.: PCT/EP00/07545

§ 371 (c)(1),
(2), (4) Date: Feb. 20, 2002

(87) PCT Pub. No.: WO01/14126

PCT Pub. Date: Mar. 1, 2001

(30) Foreign Application Priority Data

Aug. 20, 1999 (DE) .......................................... 199 39 616

(51) Int. Cl.[7] .............................................. B29C 67/00
(52) U.S. Cl. ....................... 264/40.1; 264/308; 425/112; 425/135; 425/174.4
(58) Field of Search ............................... 264/308, 40.1; 426/112, 135, 174.4

(56) References Cited

U.S. PATENT DOCUMENTS

| | | | |
|---|---|---|---|
| 5,121,329 A | 6/1992 | Crump | 364/468 |
| 5,569,431 A | 10/1996 | Hull | 264/401 |
| 6,500,378 B1 * | 12/2002 | Smith | 264/401 |
| 6,682,688 B1 * | 1/2004 | Higashi et al. | 264/497 |
| 2002/0113331 A1 * | 8/2002 | Zhang et al. | 264/40.1 |

FOREIGN PATENT DOCUMENTS

| | | |
|---|---|---|
| DE | 43 00 478 C2 | 8/1994 |
| EP | 0 403 146 | 12/1990 |
| EP | 0 422 422 A2 | 4/1991 |
| EP | 0 500 225 A1 | 8/1992 |
| EP | 0 734 842 A1 | 10/1996 |
| JP | 6-315986 | 11/1994 |
| JP | 07125081 | 5/1995 |
| JP | 10-175086 | 6/1998 |

* cited by examiner

Primary Examiner—Mary Lynn Theisen
(74) Attorney, Agent, or Firm—George W. Neuner; Edwards & Angell LLP

(57) ABSTRACT

A device and a method for generative manufacture of a three-dimensional object are provided in which
a) manufacture of an object, in a construction area of the device,
b) removal of the manufactured object from the construction area and
c) repeating steps a) and b) are carried out, wherein steps a) to c) are carried out automatically.

30 Claims, 3 Drawing Sheets

DEVICE AND METHOD FOR GENERATIVE PRODUCTION OF A THREE-DIMENSIONAL OBJECT

The present invention relates to a device and a method for generative manufacture of a three-dimensional object.

A device for generative manufacture of a three-dimensional object by selective laser sintering is known, for example, from EP 0 734 842 A. There a first layer of a powdered material is applied to a base detachably connected to a lowerable carrier and irradiated at the points corresponding to the object, so the material sinters together there. Then the carrier with the base is lowered and a second layer is applied to this first layer and again selectively sintered, the second layer therein being connected to the first layer. In this way the object is formed in layers. When the formed three-dimensional object is complete, together with the base it is taken manually out of the device. This removal limits productivity, as during removal no further object can be manufactured.

The object of the invention is to provide an improved device for generative production of a three-dimensional object with which productivity can be increased and an improved method for generative production of a three-dimensional object with which productivity can be increased.

The object is achieved by the device according to claim 1 or the method according to claim 19.

Further developments of the invention a re cited in the sub ordinate claims.

Further features and advantages of the invention emerge from the description of embodiment examples using the figures.

FIG. 5 shows the sectional view according to FIG. 3 without construction frame put in.

Figure 1:
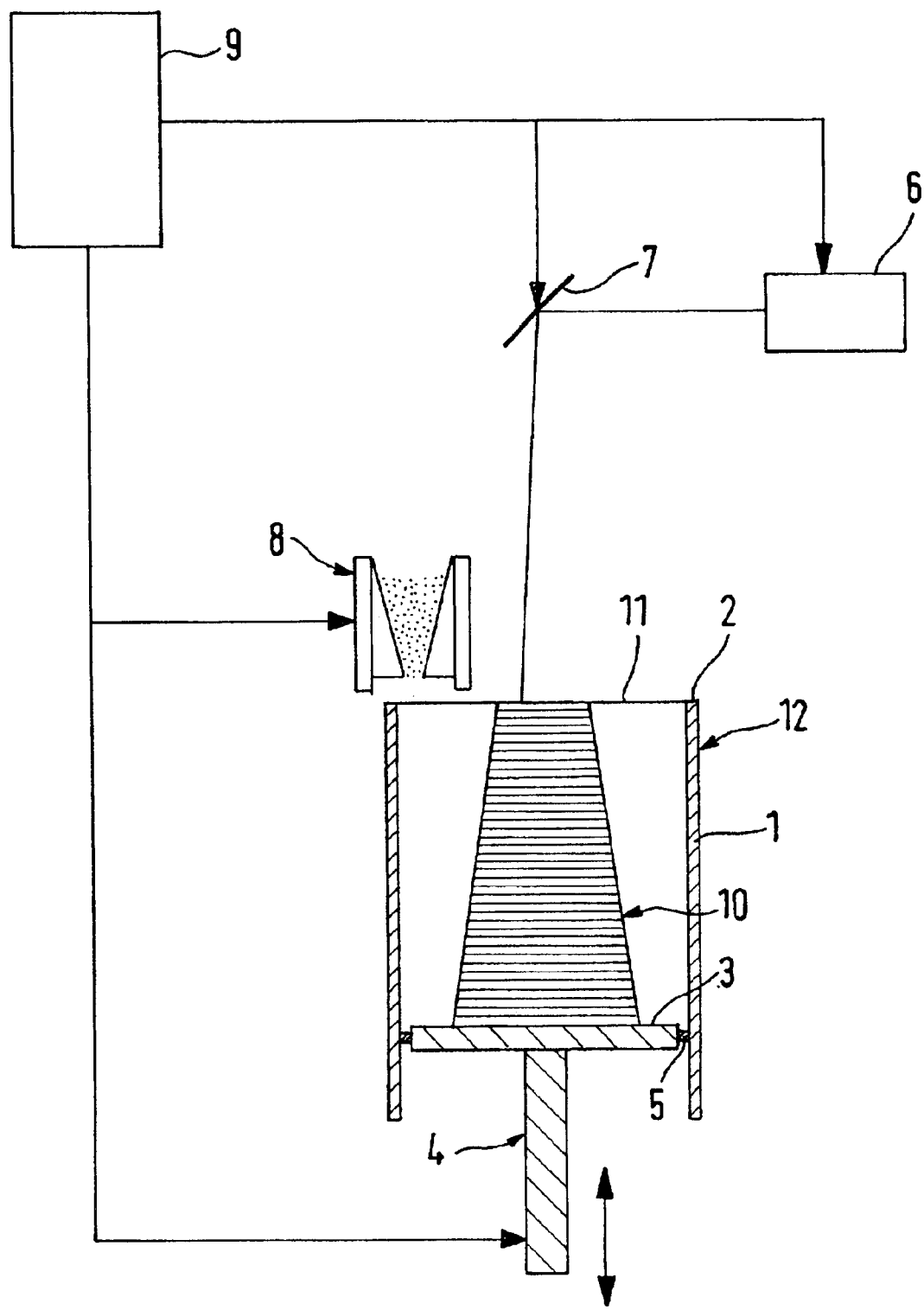
FIG. 1 shows a schematic sectional view of a device for manufacturing a three-dimensional object.

As can best be seen from FIG. 1, the device for manufacturing a three-dimensional object has a construction frame 1, open to the top and the bottom, with circular, square or rectangular cross-section with an upper edge 2. In the construction frame a construction platform 3 is provided, connected to a vertical drive 4. The construction platform 3 can be moved up and down in the vertical direction via the vertical drive 4. On the outer edge of the construction platform 3 a seal 5 is provided, which seals the gap between the construction platform 3 and the construction frame 1. Above the upper edge 2 is arranged a hardening device in the form of a laser 6 and a deflection mirror 7. Further provided is another application device 8 for applying the material to be applied to the construction platform 3. The laser 6, the deflection mirror 7, the application device 8 and the vertical drive 4 are controlled by a control system 9. In the illustration in FIG. 1 a formed object 10 is drawn in, surrounded by non-hardened material 11. The construction frame 1 and the construction platform 3 together form a mobile container 12.

Figure 2:
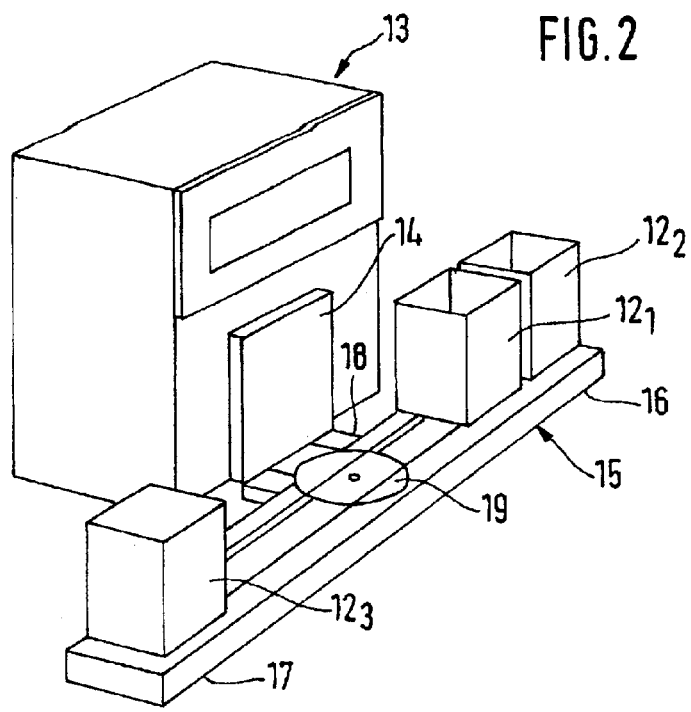
FIG. 2 shows a perspective illustration of the device for manufacturing a three-dimensional object.

The device shown in FIG. 1 is arranged in a housing 13, shown in FIG. 2. This housing 13 has on its front face a door 14, which opens and closes automatically. In the housing 13 a construction area is provided, in which the object is manufactured. The mobile container 12 is arranged in this construction area during manufacture. Further provided is a rail system 15, connected to the housing 13, with a conveyor drive, not shown, e.g. a chain drive. With this rail system 15 an empty mobile container $12_1$, $12_2$ is conveyed into the device for manufacturing a three-dimensional object and a full mobile container $12_3$, in other words a mobile container in which a formed object is contained, is conveyed out of the device. For this the rail system 15 has a feed section 16, a removal section 17 and a connecting section 18, connected to the device. The feed section 16, the removal section 17 and the connecting section 18 are connected to one another via switch gear 19. The feed section 16 and the removal section 17 are connected to a store, not shown, in which the empty mobile containers and the full mobile containers are kept.

Figure 3:
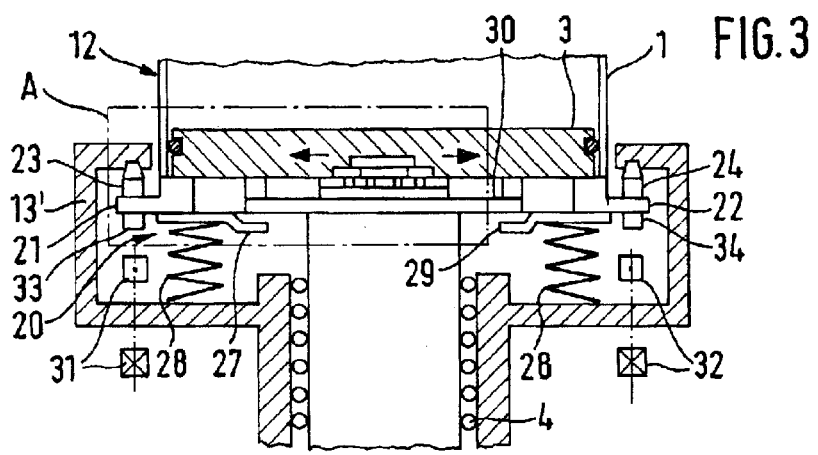
FIG. 3 shows a sectional view of a part of the device for manufacturing a three-dimensional object from FIG. 2, in which the construction frame is coupled to the mounting.
Figure 4:
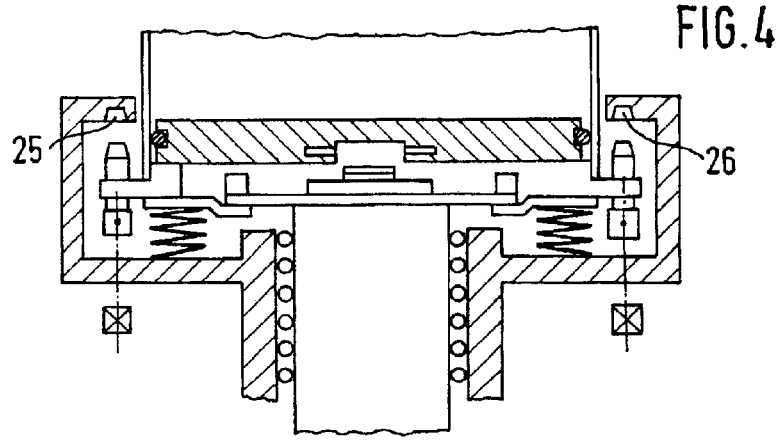
FIG. 4 shows the sectional view according to FIG. 3, in which the construction frame is uncoupled from the mounting.

As well as the rail system 15, the device contains a coupling device 20 for coupling the mobile container 12 to a mounting 13' of the housing 13 and for uncoupling the mobile container 12 from the mounting 13'. FIG. 3 shows a sectional view through the corresponding part of the mounting 13' of the housing 13, wherein a state is shown in which the mobile container 12 is coupled to the mounting 13'. As shown in FIG. 3, the construction frame 1 has in each case a projection 21, 22, projecting outwards at its lower end on both sides. On each of these projections 21, 22 an adjustable positioning element 23, 24 is provided in each case. The positioning elements 23, 24 also have in each case the effect of a stop. The length of the adjustable positioning elements 23, 24 can be set in the direction of the movement of the vertical drive 4. The mounting 13' has abutment faces 25, 26, with which the adjustable positioning elements 23, 24 are in contact in the coupled state of the mobile container 12. As can best be seen in FIG. 4, the abutment faces 25, 26 and the adjustable positioning elements 23, 24 can be constructed in such a way that in the coupled state of the mobile container 12 they engage in one another by positive locking. As can be seen from FIG. 3, the mobile container 12 is supported with its lower end on a plate 27, which is connected to the mounting 13' by springs and biased in such a way that the mobile container 12 seen in FIG. 3 is pushed upwards in such a way that the adjustable positioning elements 23, 24 are in engagement with the abutment faces 25, 26. The plate 27 is constructed in such a way that it has a recess 29 in the middle, through which the vertical drive 4 is guided. On the vertical drive 4 a carrier 30 is mounted, which, as shown in FIG. 3, is arranged above the plate 27. The carrier 30 is constructed in such a way that it is larger than the recess 29 of the plate 27. Therefore when the vertical drive 4 moves downwards the carrier 30, as shown in FIG. 4, comes into contact with the plate 27 and takes it with it in the movement downwards against the force of the spring.

Further provided, as shown in FIG. 3, are two circulating chains 31, 32, arranged below the plate 27. On the underside of the projections 21, 22 of the construction frame 1 in each case a chain coupling element 33, 34 is mounted. The chains 31, 32 and the chain coupling elements 33, 34 are arranged with respect to one another in such a way that when the construction frame 1 moves downwards the chain coupling elements 33, 34 come into contact with the chains 31, 32, as shown in FIG. 4.

Figure 6:
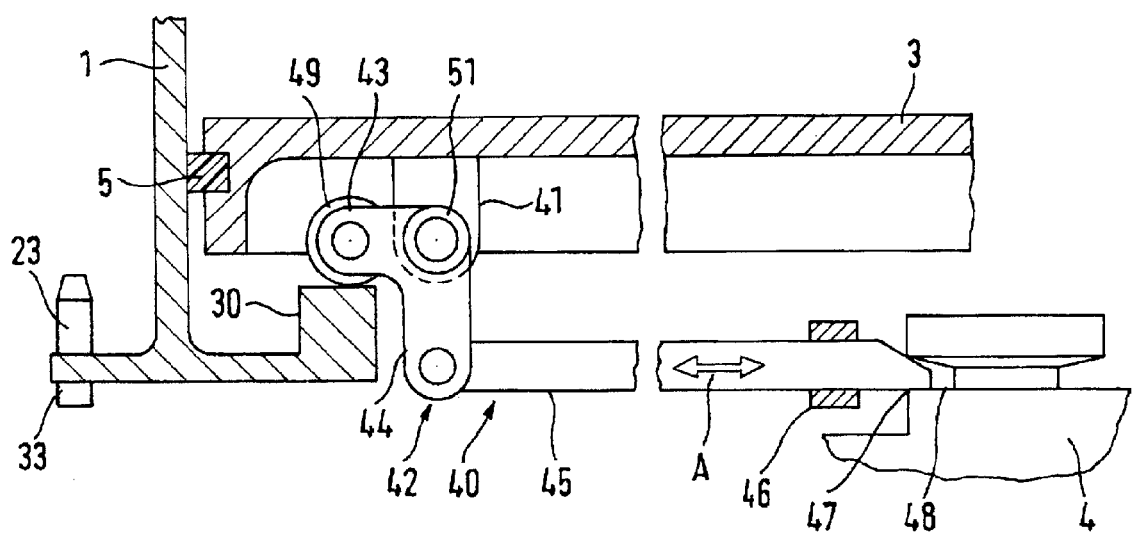
FIG. 6 shows an enlarged partial view of region A of FIG. 3.

The device further has another locking device 40, as shown in FIG. 6. FIG. 6 is a detail enlargement of area A from FIG. 3, wherein the plate 27, the springs 28 and the carrier 30 are not drawn in. On the underside of the construction platform 3 a connecting piece 41 is mounted, on which a rocker arm with a first leg 43 and a second leg 44, extending perpendicular to it, is carried so as to be rotatable over the connecting area of the two legs 43, 44 at the crossing point of the longitudinal axes of the legs. The open end of the second leg 44 is rotatably connected to a locking rod 45, which is guided in a guide 46 in such a way that the locking rod 45 in the inserted state of the mobile container 12 can be moved forwards and backwards only perpendicular to the direction of movement of the vertical drive 4, as indicated by the double arrow A in FIG. 6. The guide 46 is connected to the construction platform via a connecting element, not shown. The front end 47 of the locking rod 45, pointing away from the open end of the second leg 44, is constructed as tapering. An annular recess 48, formed corresponding to the front end 47 is provided on the vertical drive 4. A rotatably carried roller 49 is provided at the open end of the first leg 43 of the rocker arm 42. In the position of the construction platform 3 shown in FIG. 6 the roller 49 is in contact with an unlocking projection 50 of the construction frame 1. Between the rocker arm 42 and the connecting piece 41 is arranged a torsion spring 41, which biases the rocker arm in such a way that the locking rod 45 is moved towards the vertical drive 4. The rocker arm 42, the unlocking projection 50 and the locking rod 45 are arranged in such a way that on further movement of the vertical drive 4 downwards in the state shown in FIG. 6 the unlocking projection 50 presses the first leg 43 of the rocker arm 42 via the roller 49 upwards against the force of the spring of the torsion spring 51, so the locking rod 45 in FIG. 6 is moved to the left, whereby the engagement of the front end 47 with the recess 48 is released.

Figure 5:
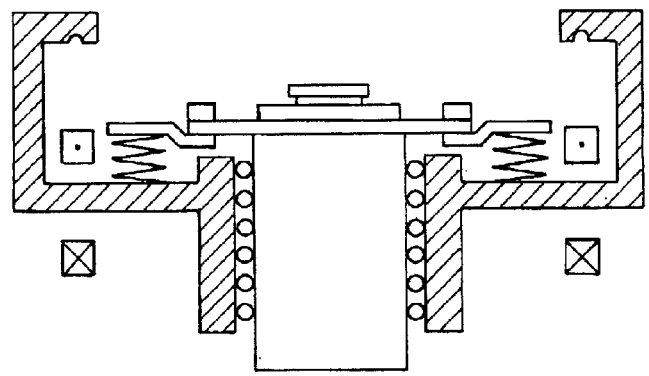

The operation of the device will now be described. It is therein assumed that a construction platform 3 and a construction frame 1 are already contained in the device or in the construction area. First the construction platform 3 is positioned in the construction frame 1 in such a way that it is positioned below the upper edge 2 of the construction frame 1 by a predetermined layer thickness. Then by means of the application device 8 a layer of the material to be hardened is applied to the construction platform 3 and then selectively hardened at the desired places with the hardening device. After that the construction platform is lowered by a desired layer thickness and a further layer of material is applied. This is again selectively hardened and therein connected to the lower layer of material. This is continued until the object to be manufactured is complete. Several objects in succession and/or on top of one another on the construction platform 3 can also be manufactured in a construction process of the sort described. Then the construction platform 3 is moved into the position shown in FIG. 3. The control system 9 controls the vertical drive 4 further in such a way that it travels from the position shown in FIG. 3 further downwards. In this way the carrier 30 comes into contact with the plate 27 and takes it with it when the vertical drive moves downwards against the force of the spring of the springs 28. In this way the mobile container 12, which is located on the plate 27, is also moved downwards. Thus the engagement between the adjustable positioning elements 23, 24 and the abutment faces 25, 26 is released. This movement of the vertical drive 4 downwards is continued until the chain coupling elements 33, 34 reach engagement with the chains 31, 32, as shown in FIG. 4. Simultaneously by this movement of the vertical drive 4 downwards the first leg 43 of the rocker arm 42 is pressed against the unlocking projection 50 of the construction frame 1, shown in FIG. 6, whereby the first leg 43 is moved towards the construction platform. In this way the locking rod 45 seen in FIG. 6 is moved to the left and the engagement between the front end 47 of the locking rod 45 and the recess 48 is released. Therefore the construction frame 1 is uncoupled from the mounting 13' and the construction platform 3 separated from the vertical drive 4. Now by means of the control system 9 the automatic door 14 (FIG. 2) is opened and the chains 31, 32 triggered, whereby the full mobile container 12 is conveyed out of the device (FIG. 5). The switch gear 19 has previously been set in such a way that the full mobile container 12 is conveyed to the removal section 17. From there the full mobile container 12 is conveyed to the store. After that the switch gear 19 is re-set in such a way that the feed section 16 is connected to the connecting section 18. Via this connection an empty mobile container $12_1$ is now conveyed into the machine. The vertical drive 4 is now moved upwards by the control system 9. In this way in reverse order the empty mobile container $12_1$ is coupled to the mounting 13' of the housing 13, as shown in FIG. 3, and the construction platform 3 is locked to the vertical drive 4, as shown in FIG. 6. The control system 9 now carries out all the activities necessary for starting a new construction process. This comprises, for example, providing the geometrical data for the object to be manufactured and checking the state of the device. This checking comprises, for example, a check of whether there is still sufficient material in the device and checking the hardening device. Based on the result of this checking, for example topping up material from an external storage vessel, cleaning the hardening device and/or carrying out a calibration of the hardening device are controlled by the control system 9. After that the control system 9 starts a new construction process and a new object is now formed on the construction platform 3 of the empty mobile container $12_1$. The steps described are all carried out automatically by means of the control system 9.

One advantage of this embodiment is that coupling and uncoupling of the construction frame 1 to the mounting 13' of the housing 13 is carried out by the movement of the vertical drive 4. This saves having an additional actuator. Furthermore, the actuating force for the locking of construction platform 3 and vertical drive 4 is also derived from the movement of the vertical drive 4. A solution of this kind has the advantage, in view of the raised temperatures occurring in this area of the construction frame, typically between 100 and 150°, when certain materials are used, such as e.g. synthetic powder, that no actuator is subjected to these temperatures. In addition there is no need for sensors or switches, which promotes simplicity and therefore reliability.

In an alternative embodiment it is possible to generate the lifting movement required for coupling the construction frame 1 to the mounting 13' of the housing 13 and for locking the construction platform 3 to the vertical drive 4 by an additional actuator. An additional actuator can also be provided in each case for each of these movements.

In a further development of the invention the housing 13 of the device bordering on the front side has a further door on one of the side walls or on the back. The rail system is then connected to this door and provided either at the side of or behind the machine. This has the advantage that the machine can be loaded manually through the door 14 on the front face and automatically via the rail system via the side or rear door. Also in a further development the control system is constructed in such a way that after the manufactured object has been removed system maintenance of the device, comprising, for example, cleaning the blades of the application device, cleaning the optics of the laser system and/or re-calibration, is carried out automatically.

A device and a method have been described in which the object is manufactured in layers by means of controlled action of a laser beam at points in each layer corresponding to the cross-section of the object. Devices and methods of this kind are, for example, a laser sintering device or a stereolithography device and the associated methods. The invention is not, however, restricted to these. Any device and any method can be provided in which the object to be manufactured is formed generatively, i.e. the object is formed by controlled adding of construction material. For example, a device can also be provided in which an object is manufactured by hardening in layers of a powdered material by means of an adhesive.

A decisive point of the present invention is that the control system 9 controls the manufacture of one or more objects, the unloading of this or these object(s) from the construction area of the device, the execution of the activities for a further construction process, forming one or more further objects, the unloading of this or these object(s), etc. in such a way that this is carried out fully automatically. In this way a fully automatic sequence of several construction processes is enabled by generative manufacturing methods. Furthermore, no manual activities are required and the productivity of the device or the method is increased.

In the embodiments described loading the construction area of the device with an empty mobile container $12_1$, $12_2$, forming the object and unloading from the mobile container $12_3$ with the object formed therein from the construction area is controlled in such a way that it is carried out automatically. It is also possible, however, for only the construction platform 3 to be replaced automatically. This is particularly the case with the kind of devices for generative manufacture or manufacture in layers of a three-dimensional object which have a construction frame rigidly connected to the machine or which have no construction frame. A device without construction frame is, for example, a device for the FDM method (FDM=fused deposition modelling), described for example in U.S. Pat. No. 5,121,329.

Furthermore, in a further embodiment it is also possible that only the manufactured object is unloaded from the construction area of the device and afterwards a further object is manufactured which is again unloaded.

Furthermore, on removal from the construction area the manufactured objects can be put into a different area of the device and later removed manually or automatically from the device.

What is claimed is:

1. A device for generative manufacture of a three-dimensional object, the device comprising:
    a construction area, in which the object is manufactured;
    a controller;
    a construction platform;
    a conveyor;
    a platform supplier, which feeds the construction platform to the conveying device; and
    a platform remover device, which removes the construction platform from the device from the conveying device after the object is manufactured;
    wherein the controller controls the execution of the following steps:
    a) manufacture of an object;
    b) removal of the manufactured object from the construction area; and
    c) repeating steps a) and b);
    wherein at least step b) utilizes the conveyor, and
    wherein the platform supplier and platform remover are connected to the conveying device by a switch gear.

2. A device for generative manufacture of a three-dimensional object, the device comprising:
    a construction area, in which the object is manufactured;
    a controller;
    a construction platform;
    a conveyor;
    a traveling actuator, which sets the position of the construction platform in the construction area; and
    a connector, which connects the construction platform to the actuator
    wherein the controller controls the execution of the following steps;
    a) manufacture of an object;
    b) removal of the manufactured object from the construction area; and
    c) repeating steps a) and b);
    wherein at least step b) utilizes the conveyor.

3. The device according to claim 2, further comprising a connection final control element, which actuates the connector.

4. The device according to claim 3, wherein the connection final control element is the actuator.

5. The device according to claim 2, wherein the construction platform comprises the connector.

6. A device for generative manufacture of a three-dimensional object, the device comprising:
    a construction area, in which the object is manufactured;
    a controller;
    a construction platform;
    a conveyor; and
    a construction frame, which surrounds the construction platform, and which is moved together with the construction platform
    wherein the controller controls the execution of the following steps:
    a) manufacture of an object;
    b) removal of the manufactured object from the construction area; and
    c) repeat steps a) and b);
    wherein at least step b) utilizes the conveyor.

7. The device according to claim 6, further comprising:
    a mounting; and
    a coupler, which joins the construction frame to the mounting during loading and detaches the construction frame from the mounting during unloading.

8. The device according to claim 7, wherein the coupler comprises a coupling element, which joins the construction frame with the mounting.

9. The device according to claim 7, further comprising a coupling final control element for coupling and/or uncoupling.

10. The device according to claim 7, wherein the coupling final control element is the actuator.

11. The device according to claim 9, wherein the coupler element is biased and the coupler comprises a carrier connected to the coupling final control element, wherein the carrier can be moved by the coupling final control element to move the coupling element against the bias.

12. The device according to claim 7, wherein the coupler comprises an adjustable positioning element, with which the relative position of the construction frame to the mounting in the coupled state can be set.

13. A method for generative manufacture of a three-dimensional object with a device; the method comprising the steps of:

a) automatically loading of the construction area of the device with a construction platform for carrying the object to be manufactured;

b) manufacturing the object on the construction platform in a construction area;

c) automatically removing the manufacture object from the construction area;

d) repeating steps a), b) and c);

wherein step a) further comprises connecting the construction platform to a traveling actuator for setting the position of the construction platform in the construction area.

14. A method for generative manufacture of a three-dimensional object with a device; the method comprising the steps of;

a) automatically loading of the construction area of the device with a construction platform for carrying the object to be manufactured;

b) manufacturing the object on the construction platform in a construction area;

c) automatically removing the manufactured object from the construction area; and d) repeating steps a), b) and c):

wherein step a) further comprises automatically loading the construction platform into the construction area with a construction frame surrounding the construction platform.

15. The method according to claim 14, further comprising connecting the construction frame to a mounting of the device.

16. The device according to claim 1, further comprising an applicator for supplying hardenable material on to the construction platform; and a hardening device, which selectively hardens the material.

17. The device according to claim 1, wherein the device is structured and arranged such that the object can be manufactured in layers.

18. The device according to claim 1, wherein the controller is structured and arranged such that, after the manufactured object has been removed, a system maintenance of the device is carried out automatically.

19. The device according to claim 2, further comprising an applicator for supplying hardenable material on to the construction platform; and a hardening device, which selectively hardens the material.

20. The device according to claim 2, wherein the device is structured and arranged such that the object can be manufactured in layers.

21. The device according to claim 2, wherein the controller is structured and arranged such that, after the manufactured object has been removed, a system maintenance of the device is carried out automatically.

22. The device according to claim 6, further comprising an applicator for supplying hardenable material on to the construction platform; and a hardening device, which selectively hardens the material.

23. The device according to claim 6, wherein the device is structured and arranged such that the object can be manufactured in layers.

24. The device according to claim 6, wherein the controller is structured and arranged such that, after the manufactured object has been removed, a system maintenance of the device is carried out automatically.

25. The method according to claim 13, wherein the device comprises an applicator for supplying hardenable material onto the construction platform, and a hardening devices which selectively hardens the material, and step b) further comprises:

supplying hardenable material onto the construction platform; and selectively hardening the material.

26. The method according to claim 13, wherein the device is structured and arranged such that the object can be manufactured in layers and the step b) further comprises manufacturing the object in layers.

27. The method according to claim 13, wherein the device comprises a controller that is structured and arranged such that, after the manufactured object has been removed, a system maintenance of the device is carried out automatically and step c) further comprises carrying out automatically a system maintenace.

28. The method according to claim 14, wherein the device comprises an applicator for supplying hardenable material onto the construction platform, and a hardening device, which selectively hardens the material, and step b) further comprises:

supplying hardenable material onto the construction platform; and selectively hardening the material.

29. The method according to claim 14, wherein the device is structured and arranged such that the object can be manufactured in layers and the stop b) further comprises manufacturing the object in layers.

30. The method according to claim 14, wherein the device comprises a controller that is structured and arranged such that, after the manufactured object has been removed, a system maintenance of the device is carried out automatically and step c) further comprises carrying out automatically a system maintenace.

* * * * *